(12) United States Patent
Perronnin et al.

(10) Patent No.: US 9,298,982 B2
(45) Date of Patent: Mar. 29, 2016

(54) SYSTEM AND METHOD FOR COMPUTING THE VISUAL PROFILE OF A PLACE

(75) Inventors: Florent Perronnin, Doméne (FR); Nicolas Guérin, Notre-Dame-de-Mésage (FR); Craig John Saunders, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 940 days.

(21) Appl. No.: 13/190,753

(22) Filed: Jul. 26, 2011

(65) Prior Publication Data

US 2013/0028508 A1 Jan. 31, 2013

(51) Int. Cl.
*G06K 9/00* (2006.01)

(52) U.S. Cl.
CPC .................................. *G06K 9/00476* (2013.01)

(58) Field of Classification Search
CPC .. G06F 17/3087; H04W 4/185; H04W 4/021; H04W 40/20; H04L 67/18; H04N 2201/3253; H04M 1/72572; Y02B 60/188; G06K 9/00476
USPC ................................................. 382/224, 231
See application file for complete search history.

(56) References Cited

U.S. PATENT DOCUMENTS

| | | | |
|---|---|---|---|
| 7,657,907 B2 | 2/2010 | Fennan et al. | |
| 2003/0021481 A1 | 1/2003 | Kasutani | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0144068 A1* | 6/2008 | Digby | 358/1.13 |
| 2008/0154798 A1* | 6/2008 | Valz | 705/400 |
| 2008/0240572 A1 | 10/2008 | Hoshii | |
| 2008/0317358 A1 | 12/2008 | Bressan et al. | |
| 2009/0060340 A1* | 3/2009 | Zhou | 382/190 |
| 2009/0144033 A1 | 6/2009 | Liu et al. | |
| 2009/0190797 A1 | 7/2009 | McIntyre et al. | |
| 2009/0257663 A1 | 10/2009 | Luo et al. | |
| 2009/0290812 A1 | 11/2009 | Naaman et al. | |
| 2010/0036883 A1 | 2/2010 | Valencia-Campo et al. | |
| 2010/0040285 A1 | 2/2010 | Csurka et al. | |
| 2010/0076968 A1* | 3/2010 | Boyns et al. | 707/732 |
| 2010/0092084 A1 | 4/2010 | Perronnin et al. | |

(Continued)

OTHER PUBLICATIONS

Akcay et al, "Automatic Detection of Geospatial Objects Using Multiple Hierarchical Segmentations", Jul. 2008, IEEE Transactions on Geoscience and Remote Sensing, vol. 46, No. 7, pp. 2097-2111.*

(Continued)

*Primary Examiner* — Edward Park
(74) *Attorney, Agent, or Firm* — Fay Sharpe LLP (57) ABSTRACT

A system and method for computing a place profile are disclosed. The method includes providing a geographical definition of a place, retrieving a set of images based on the geographical place definition. With a classifier, image-level statistics for the retrieved images are generated. The classifier has been trained to generate image-level statistics for a finite set of classes, such as different activities. The image-level statistics are aggregated to generate a place profile for the defined place which may be displayed to a user who has provided information for generating the geographical definition or used in an application such as a recommender system or to generate a personal profile for the user.

20 Claims, 4 Drawing Sheets

(56) References Cited

U.S. PATENT DOCUMENTS

| | | | |
|---|---|---|---|
| 2010/0098343 | A1 | 4/2010 | Perronnin et al. |
| 2010/0111428 | A1 | 5/2010 | Yu et al. |
| 2010/0121566 | A1 | 5/2010 | Joshi et al. |
| 2010/0169178 | A1 | 7/2010 | Wang et al. |
| 2010/0189354 | A1 | 7/2010 | de Campos et al. |
| 2010/0191743 | A1 | 7/2010 | Perronnin et al. |
| 2010/0318477 | A1 | 12/2010 | Perronnin et al. |
| 2010/0331016 | A1* | 12/2010 | Dutton et al. ............... 455/456.3 |
| 2011/0026831 | A1 | 2/2011 | Perronnin et al. |
| 2011/0040711 | A1 | 2/2011 | Perronnin et al. |
| 2011/0091105 | A1 | 4/2011 | Perronnin |
| 2012/0084302 | A1* | 4/2012 | Murdock et al. .............. 707/754 |
| 2012/0321175 | A1* | 12/2012 | Hedau et al. ................. 382/159 |

OTHER PUBLICATIONS

Li, et al., "Landmark classification in large-scale image collections," International Conference on Computer Vision, pp. 1957-1964 (2009).

Luo, et al., "Geotagging in a multimedia and computer vision—a survey," Multimedia Tools and Applications, Kluwer Academic Publishers, vol. 51, No. 1, pp. 187-211 (Oct. 2010).

Gammeter, S., et al. "I know what you did last summer: object-level auto-annotation of holiday snaps", 2009, IEEE $12^{th}$ International Conf. on Computer Vision, pp. 614-621.

Sanchez, J., et al. "High-dimensional signature compression for Large-scale image classification", CVPR, 2011, pp. 1665-1672.

Zheng, Y., et al. "Tour the world: building a web-scale landmark recognition engine", CVPR, 2009 pp. 1-8.

U.S. Appl. No. 13/050,587, filed Mar. 17, 2011, Saunders.

U.S. Appl. No. 12/693,795, filed Jan. 26, 2010, Skaff, et al.

U.S. Appl. No. 12/859,898, filed Aug. 20, 2010, Perronnin, et al.

U.S. Appl. No. 12/890,789, filed Sep. 27, 2010, Sanchez, et al.

Perronnin, et al. "Fisher Kernels on Visual Vocabularies for Image Categorization", in Proc. of the IEEE Conf on CVPR, Jun. 2007, pp. 1-8.

Jegou, et al. "Improving Bag-Of-Features for Large Scale Image Search" in IJCV, 2010, p. 1-21.

Perronnin, et al. "Improving the fisher kernel for large-scale image classification", ECCV, 2010, p. 1-14.

Lowe, "Distinctive Image features from scale-invariant keypoints", IJCV, 2004, vol. 60.

\* cited by examiner

SYSTEM AND METHOD FOR COMPUTING THE VISUAL PROFILE OF A PLACE

BACKGROUND

The exemplary embodiment relates generally to automated systems and methods for profiling and finds particular application in connection with profiling of geographical locations based on image data.

The widespread use of digital cameras and other devices adapted to capturing images, such as mobile phones, has lead to the public availability of large numbers of images which are often tagged with geographical location information in the form of geo-tags and keyword information. Digital images are often shared among users in large databases of visual data, for example, via community photograph collections such as the Flickr® collection. A user interested in photographs of a particular city, such as London, for example, could enter a keyword search for "London" and be presented with a large number of images. Despite the abundance of publicly-accessible image data, the information is not organized in a way which allows a user to get a representative view of a place of interest.

The exemplary embodiment provides a system and an automated method for computing a visual profile of a place.

INCORPORATION BY REFERENCE

The following references, the disclosures of which are incorporated herein by reference in their entireties, are mentioned:

U.S. patent application Ser. No. 13/050,587, filed on Mar. 17, 2011, entitled SYSTEM AND METHOD FOR ADVERTISING USING IMAGE SEARCH AND CLASSIFICATION, by Craig Saunders and Nicolas Guerin, discloses computing the profile of a person based on categorization of images in the person's collection.

The following relate generally to visual classification and image retrieval methods: U.S. Pub. Nos. 20030021481; 2007005356; 20070258648; 20080069456; 20080240572; 20080317358; 20090144033; 20100040285; 20100092084; 20100098343; 20100191743; 20100189354; 20100318477; 20110040711; 20110026831; 20110091105; U.S. application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sánchez, et al., Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; F. Perronnin, J. Sánchez, and T. Mensink, "Improving the fisher kernel for large-scale image classification," in ECCV 2010; Jorge Sánchez and Florent Perronnin, "High-dimensional signature compression for large-scale image classification," in CVPR, 2011.

BRIEF DESCRIPTION

In accordance with one aspect of the exemplary embodiment, a method for computing a place profile includes providing a geographical definition of a place and retrieving a set of images based on the place definition. Retrieved images in the set are classified with a classifier. The classifier has been trained to generate image-level statistics for a finite set of classes. The method further includes aggregating the image-level statistics to generate a place profile for the defined place. One or more of the steps of the method may be performed with a computer processor.

In accordance with another aspect of the exemplary embodiment, a system for computing a place profile includes a place definition component for generating a definition of a place, based on information received from a user. An image selection component retrieves a set of images corresponding to the defined place from an associated database of images, the images being tagged with geoposition information. An image classification trained on a finite set of classes classifies the retrieved images to generate image-level statistics. A profile component aggregates the image-level statistics to generate a place profile for the geographically-defined place. The components of the system may be implemented by a processor and/or stored in non-transitory memory.

In another aspect of the exemplary embodiment, a method for generating a visual representation of a place profile includes, for a predefined set of activity classes, training a classifier on training images labeled according to the activity classes in the set of classes. A geographical definition of a place is generated, based on information supplied by a user. A set of images is retrieved from an image database based on the place definition and on geoposition information associated with images in the database. With the trained classifier, image-level statistics are computed for the retrieved images in the set of retrieved images. The image-level statistics are aggregated to generate a place profile for the defined place and a visual representation of the place profile is generated for display to a user. One or more of the steps of the method may be performed with a computer processor.

DETAILED DESCRIPTION

Aspects of the exemplary embodiment relate to a system and method for automatically computing a visual profile of a place ("place profile") for a given place using repositories of geo-tagged visual data (e.g., photographic images and/or videos). In particular, statistics are computed with respect to a given taxonomy of classes. Aspects of the exemplary embodiment also relate to a place profile computed from geo-tagged images using image classification and to a user interface which allows a user to query the system about a particular place of interest and to visualize the results. Various applications of such a place profile are also disclosed herein, such as recommender systems and targeted advertising.

The exemplary place profile is a statistical description of a given place in terms of a set of classes. This profile of a given place (e.g. a region, a city, or a district) is computed automatically, with respect to the pre-defined taxonomy of classes. Typical classes (categories) correspond to activities, such as tourist activities (e.g., types of activities that tourists may be interested in when visiting a new place). The method can leverage the substantial amount of geo-tagged data available on the Internet.

The geo-tagged image data may be specifically generated for the task. However, by using geo-tagged photo collections which have not been specifically designed for the place profile generation, the activity-based profile of a place based on these photo collections reflects what people actually did and found to be of interest, rather than what a professional photographer may expect to be of interest.

The exemplary method uses supervised learning to train a classifier to assign activity classes to unlabeled images.

The exemplary visual place profile may complement other sources of information, e.g., profiles based on textual information. However, a significant advantage of the exemplary visual place profile is that it can make use of geo-tagged images while text is generally not geo-tagged.

Figure 1:
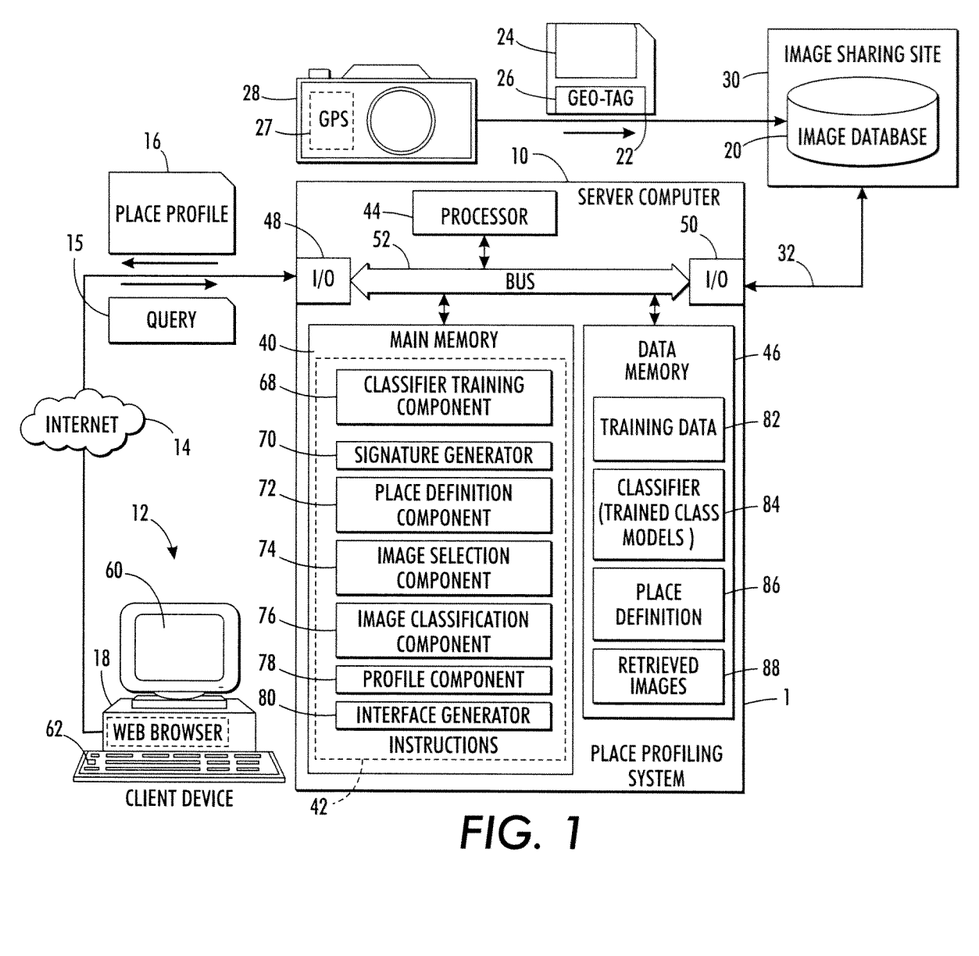
FIG. 1 is a functional block diagram of an environment in which a system for computing a profile of a place operates in accordance with one aspect of the exemplary embodiment.

With reference to FIG. 1, a computer-implemented system 1 for generating a profile for a place is illustrated. The system 1 may be implemented in one or more computing devices and the exemplary arrangement of computing devices is intended to be illustrative only. The system 1 includes a server computer 10 which communicates with a client computing device 12 via a wired or wireless connection 14, such as a local area network or wide area network, such as the Internet. A user operating on the client device 12 can enter a query 15 concerning a geographical place of interest and view a visual profile 16 of the place through a graphical user interface (GUI) generated by the system 1, alone or in cooperation with the client device 12, e.g., using a web browser 18 operating on the client device 12.

The exemplary visual place profile 16 includes class scores for each of a plurality of predefined classes, the class scores being based on the automatic classification of a set of photographic images which are geographically associated with a place of interest. In general, the visual profile 16 can include non-zero class scores for a plurality of the predefined classes, e.g. as a histogram of class scores generated through aggregation of image-level statistics, as explained in greater detail below.

The exemplary system 1 has access to a database 20 of images. The image database 20 includes a large collection of geographically labeled (geo-tagged) images 22. Each geo-tagged image 22 in the database 20 includes image data 24 for an array of pixels forming an image as well as metadata 26 associated with the image data, which provides information on a geographical location in which the image was captured, e.g., according to coordinates of longitude and latitude. Typically, each geo-tag 26 includes geo-positional (GPS) information which is acquired automatically at the time of image capture by a GPS component 27 of an image capture device 28, such as a camera, mobile phone, laptop, or the like. The information 26 may be in the form of exchangeable image file format (EXIF) data in the case of image files from cameras, smartphones the like. However, it is also contemplated that the geo-tag 26 could be manually created by a user, for example, using an external GPS device to obtain the information when the camera 28 is not equipped to do so.

The exemplary digital images 22 are photographic images, such as individual photographic images (photos), video images (videos), and combinations thereof which may be multicolor (color) and/or monochrome (black and white) images. The images 22 may be stored in any convenient file format, such as JPEG, Graphics Interchange Format (GIF), JBIG, Windows Bitmap Format (BMP), Tagged Image File Format (TIFF), or the like. The image data 24 may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.).

The database 20 may be stored remotely from the computer 10, e.g., on a remote server 30 hosted by an image sharing website. The computer 10 has access to the database 20 via a wired or wireless link 32, analogous to link 14.

Computer 10 includes main memory 40 which stores software instructions 42 for performing the exemplary method described with reference to FIG. 2, and a processor 44, in communication with the memory 40, for executing the instructions 42. The processor 44, such as the computer's CPU, may also control the operation of computer 10. Data memory 46, separate from or integral with the main memory 40, stores data used in computing a place profile 16. The computer 10 includes one or more network interface (input/output I/O) components 48, 50 for enabling the server to communicate with external devices 12, 30, via the network 14, 32. Hardware components 40, 44, 46, 48, 50 of the system 1 may communicate via a data\control bus 52.

Memory 46 may be resident on the computer 10 or on a linked computing device(s). Client device 12 and remote server 30 may be similarly configured to the illustrated computer 10, except as noted, i.e., with a respective processor, memory, and a network interface. Client device 12 also includes a display device 60, such as a computer monitor or LCD screen, and one or more user input devices 62, such as a keyboard, keypad, cursor control device, touch screen, or the like, for inputting commands to the client device processor. The client device 12 may be a specific or general purpose computer, such as a PC, such as a desktop, a laptop, tablet, or palmtop computer, a portable digital assistant (PDA), mobile phone, or other computing device having an associated display. In some embodiments, the system 1 may be resident wholly or partly on client device 12.

The digital processor 44 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor. The memory or memories 40, 46 may represent any type of non-transitory computer readable medium such as random access memory (RAM), read only memory (ROM), magnetic disk or tape, optical disk, flash memory, or holographic memory. In one embodiment, the memory 40, 46 comprises a combination of random access memory and read only memory. Exemplary memory 40, 46 stores instructions for performing the exemplary method and data used and generated therein, as well operating instructions for operating the computer 10.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As described in further detail below with reference to the exemplary method, the system includes various software components 68, 70, 72, 74, 76, 78, 80 for implementing the method, including a classifier training component 68, for definition and training of a taxonomy of classes. For example, the classifier training component 68 takes as input training data 82, which includes a set of geo-tagged images labeled according to class, and learns parameters of a classifier 84, based on the training data 82. The classifier 84 can be a set of trained class models, one for each class (or a single multi-class classification model). A signature generation component 70 generates representations of images 82 in a suitable format for use in training the class models 84 and for generating representations of images 22. A place definition component 72 generates a definition 86 of a place under consideration, e.g., based on input geographical coordinates of latitude and longitude. An image selection component 74 retrieves a set 88 of the geo-tagged images 22 from the database 20, based on the place definition 86. An image classification component 76 applies the trained class model(s) 84 to the retrieved images 88 and outputs image-level statistics. A profile component 78 aggregates the image-level statistics into a place-level profile 16, which can be presented to a user and/or used to generate other information, such as advertizing content, or the like. An interface generator 80 generates a graphical user interface for display to a user on the display device 60.

Components 68, 70, 72, 74, 76, 78, 80, of the system may be implemented in hardware or a combination of hardware and software. As will be appreciated, the components need not all reside on the same device 10. Additionally, when the class models 84 have been trained, component 68 may no longer be needed and can be omitted. In other embodiments, the models 84 may be trained with a separate computer system. Additionally, rather than retrieving images 22 in their entirety, the image signatures of the images 24 in the database 20 may be pre-computed, such that the "retrieved images" 88 may simply be retrieved image signatures for the respective images 24 and the images' corresponding geo-tags 26.

Figure 2:
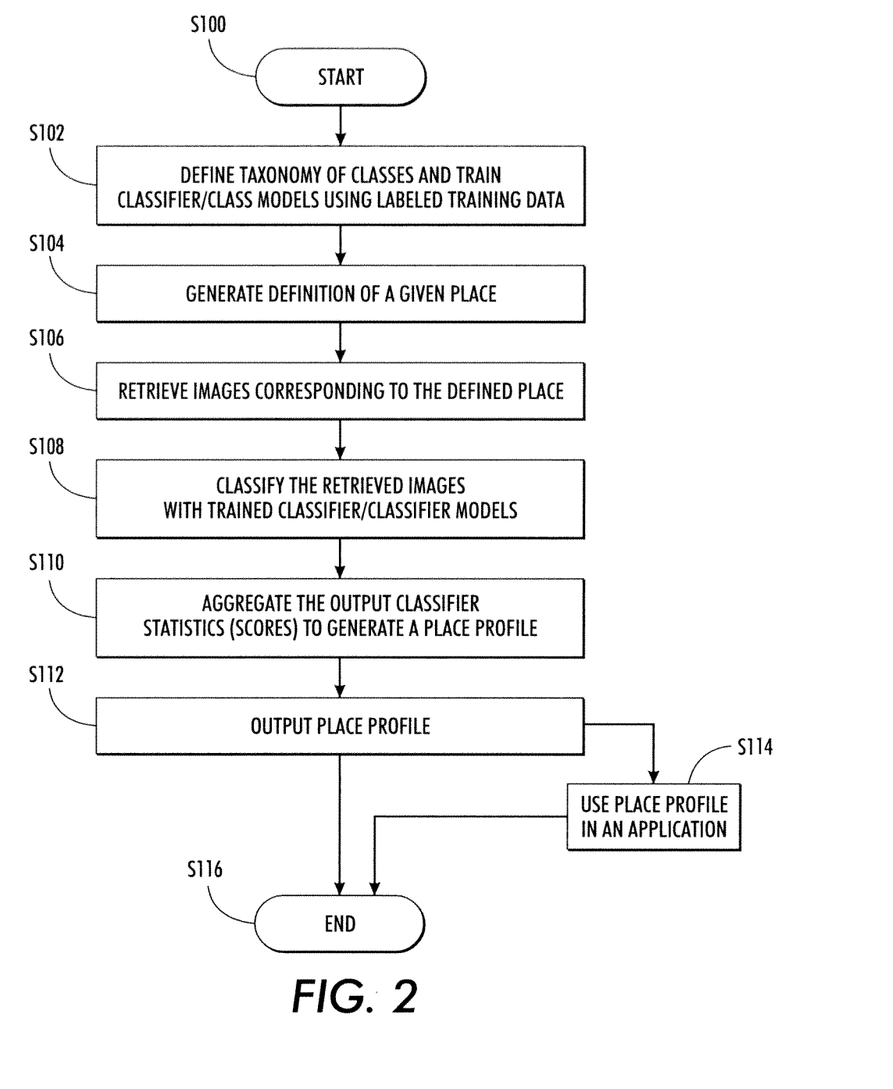
FIG. 2 is a flow diagram which illustrates a method for computing a profile of a place in accordance with another aspect of the exemplary embodiment.

With reference also to FIG. 2, a flow chart illustrating a computer-implemented method for generating a place profile is shown. The method begins at S100 and may proceed as follows.

At S102, a taxonomy of classes is defined and a classifier (multi-class or set of class models 84) is trained for these classes using labeled training data 82.

At S104, a geographical definition of a given place is generated or otherwise provided.

At S106, a set 88 of images corresponding to the place definition generated at S104 is retrieved from database 20 and may be stored in local memory 46.

At S108, the retrieved images 88 are classified (using their image signatures as input to the classifier 84) to provide image-level statistics with respect to the given taxonomy of classes.

At S110, the image-level statistics output as S108 are aggregated to generate a place-level profile 16.

At S112, the place profile 16 or a representation thereof is output, e.g., to client device 12.

At S114, the place profile 16 may be used as information in an application such as for generating advertizing content or a recommender system.

The method ends at S116.

Further details of the system and method will now be described.

1) Definition and Training of a Taxonomy of Classes (S102)

The exemplary method relies on the pre-definition of a finite set of two or more classes. Exemplary classes can correspond loosely to activities, such as activities related to man-made structures, e.g., "architecture," "visiting museums"; sports-related activities, such as "climbing," "skiing," "swimming," "tennis"; specific location-related activities, such as "landmark sightseeing," "beach," "mountains"; and general-interest activities such as "food," "music," and the like. For some applications there may be at least 10, 50, or at least 200 of such classes, such as up to 1000 classes, or more. However, it is to be appreciated that the granularity of the classes may depend on the application. For some applications, for example, a class such as "architecture" may be sufficient but for other applications, a more refined taxonomy, e.g., church, castle, temple, stadium, and so forth may be more appropriate. Additionally, classes may be grouped hierarchically, so that, for example, where there are only a few images in the classes that form a group, a higher level class may be presented.

As will be appreciated, the above classes are exemplary only and the number and type of classes can be varied to suit the application. The taxonomy can be defined by a specific user as a preliminary step (e.g., the user is allowed to select from a large number of predefined classes for which labeled training images are available) or a predefined set of classes may be developed by considering the type of activities in which users in general may be interested.

A labeled set of images 82 is used to train the corresponding class models 84. The exemplary classifier models(s) may be linear or nonlinear, and may be trained with any suitable classification training algorithm, such as sparse logistic regression, naïve Bayes, linear discriminant analysis, support vector machines, linear regression, or any other suitable machine learning method.

A quantitative image representation or "signature" is derived from each training image 82, which together with the each training image's manually applied label(s) serve as the input to the class model, during training. The exemplary image signatures are vectorial representations, which can be of a fixed length and which are derived by computing, for each of one or more low-level local feature types, a set of statistics for patches of the image and then aggregating these statistics into an image-level representation.

In this approach, the image is divided into patches (regions), a representative vector is constructed for each patch, and these results are concatenated or otherwise combined to generate the signature. The use of patches distributed across the image ensures that the quantitative representation is representative of the image as a whole while also including components representing smaller portions of the image. In some approaches, the patches may be of varying sizes and may overlap in order to provide components representing different objects (e.g., faces, animals, sky, and the like) having different size scales and located at different, and possibly overlapping, places in the image.

The patches can be obtained by image segmentation, by applying specific interest point detectors, by considering a regular grid, or simply by random sampling of image patches. For example, at least about 100 patches are extracted from each region. More generally, over the image as a whole, at least 1000 and in some cases, at least 10,000 patches may be extracted. The number of patches can be up to 100,000 or more, depending on the size of the image file.

The low level features which are extracted from the patches are typically quantitative values that summarize or characterize aspects of the respective patch, such as spatial frequency content, an average intensity, color characteristics (in the case of color images), gradient values, and/or other characteristic values. In some embodiments, at least about fifty low level features are extracted from each patch, which may be concatenated or otherwise combined to generate a descriptor of the patch. However, the number of features that can be extracted is not limited to any particular number or type of features for example, 1000, 10,000, or 100,000 low level features could be extracted depending on computational capabilities. In the exemplary embodiment, the low level features include local (e.g., pixel) color statistics, and texture. For color statistics, local RGB statistics (e.g., mean and standard deviation) may be computed. For texture, gradient orientations (representing a change in color) may be computed for each patch as a histogram to generate gradient feature descriptors, such as Scale Invariant Feature Transform (SIFT) descriptors (SIFT-like features). In the exemplary embodiment two (or more) types of low level features, such as color and texture, are separately extracted and a high level representation of the patch or image is based on a combination (e.g., a sum or a concatenation) of two descriptors, one for each feature type.

In the exemplary embodiment, SIFT descriptors, as described by Lowe, in "Object Recognition From Local Scale-Invariant Features," International Conference on Computer Vision (ICCV), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the patches. Examples of some other suitable descriptors are set forth by K. Mikolajczyk and C. Schmid, in "A Performance Evaluation Of Local Descriptors," Proceedings of the Conference on Computer Vision and Pattern Recognition (CVPR), Madison, Wis., USA, June 2003, which is incorporated in its entirety by reference.

In one illustrative example employing SIFT features, the features are extracted from 32×32 pixel patches on regular grids (every 16 pixels) at five scales, to provide 128 dimensional SIFT descriptors. Other suitable features include simple 96-dimensional color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA).

For each type of low-level local feature, a set of statistics is computed for each patch in the form of a local descriptor. The statistics are aggregated to generate a region level or image-level representation. For computational efficiency reasons, two techniques for generating image representations which model the distribution of feature sets using fixed-length vectorial representations can be employed: the bag-of-visual-words (BOV) and the Fisher vector (FV) (or Fisher kernel (FK)).

In the "bag-of-visual-words" (BOV) method, the "bag of words" is suitably a vector or other representation whose components indicate occurrence frequencies (or counts) of "visual words" in the image. In such "bag of visual words" representations, each visual word in a visual vocabulary corresponds to a grouping of typical low-level features. The Fisher kernel (FK) is a generic framework which combines the benefits of generative and discriminative approaches for image classification. In the context of image classification, the FK has been used to extend the bag-of-visual-words (BOV) representation by going beyond count statistics. See, e.g. Perronnin et al., "Fisher kernels on visual vocabularies for image categorization" in CVPR (2007).

Descriptions of such methods for computing image signatures are provided in the above-mentioned list of references, incorporated by reference herein. By way of example, the method and system described in Jorge Sánchez and Florent Perronnin, "High-dimensional signature compression for large-scale image classification," in CVPR, 2011, and in copending U.S. application Ser. No. 12/890,789, entitled IMAGE CLASSIFICATION EMPLOYING IMAGE VECTORS COMPRESSED USING VECTOR QUANTIZATION, by Jorge Sánchez, et al. may be employed (both of these references will be referred to herein as "Sánchez"). This image classification technology is particularly suited to a large-scale classifier where large numbers of images may be used in training and/or classification.

For example, the classifier training component 68 and/or image classification component 76 includes or accesses the signature generator 70 for generating image signatures of training images 82 and retrieved images 88. The signature generator 70 includes a patch extractor, which extracts and analyzes the content-related low level features of patches of the image 22, such as shape, texture, color, or the like. The extracted descriptors (such as vectors) from each patch are concatenated and optionally reduced in dimensionality, to form a features vector. The feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given an image to be assigned an image signature, each extracted feature vector is assigned to its closest visual word in the previously trained vocabulary or to all visual words in a probabilistic manner in the case of a stochastic model. A histogram is computed by accumulating the occurrences of each visual word. This is the image's signature.

Typically, each class model 84 has adjustable parameters whose values are determined by training on the labeled training set. The objective of the training is to select the adjustable parameters such that the output of the classifiers substantially agrees with the classification labels assigned to the images of the training set. The exemplary class models 84 are binary classifiers which are each trained on a set of positive samples for the class and a set of negative samples, the positive samples being the signatures of images labeled with the respective class of images and the negative samples being the signatures of images not labeled with the respective class of images (which may be drawn at random from the remainder of the training set). The trained class models 84 are then used by the image classification component 76 to assign an unlabeled, retrieved image 88 to one or a subset (less than all) of the classes, or assign it probabilistically over all classes, based on its computed image signature. A soft (probabilistic) classification can be converted to a hard classification by thresholding. For example, the trained class models may each assign a score based on how well an image signature of the retrieved image matches the model.

The local descriptors extracted from the patches can comprise SIFT descriptors. See, e.g. Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-D SIFT descriptors. Other suitable features include simple 96-D color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA). These are merely illustrative examples, and additional and/or other local descriptors can be used.

In the exemplary embodiment, an image vector is computed for each image (or for each of a plurality of image regions) based on the extracted local descriptors of that image (or image region). Advantageously, partitioning the image into regions retains spatial location information in the image, for example, faces and sky are typically found in the top portion of an image.

In some illustrative examples, a Fisher vector is computed for each image region by modeling the extracted local descriptors of the image region using a mixture model to generate a corresponding image region vector having vector elements that are indicative of parameters of mixture model components of the mixture model representing the extracted local descriptors of the image region. The exemplary mixture model is a Gaussian mixture model (GMM) comprising set of Gaussian functions (Gaussians) to which weights are assigned in the parameter training, each Gaussian represented by its mean vector, and covariance matrix. It is assumed that the covariance matrices are diagonal. See, e.g., Perronnin et al., "Fisher kernels on visual vocabularies for image categorization" in CVPR (2007). Where Fisher vectors are computed for image regions, these can be concatenated to form the final image vector representing the image. Methods for computing Fisher vectors are more fully described in Sánchez.

The trained GMM is intended to describe the content of any image within a range of interest (for example, any color photograph if the range of interest is color photographs; or, any image of a black and white document if the range of interest is black and white documents, or so forth).

The image signature (vector) representing the image 24 is substantially more compact than the image 24 itself, where compactness or size is measured by the amount of memory or storage occupied by the image vector or image. However, the image vector can still be relatively large. By way of example, in some suitable embodiments: the GMM includes 256 Gaussian components; the descriptors have dimensionality D=64; and partitioning is employed with the number of image regions being R=4. If the Fisher vector of includes gradients computed for each Gaussian mean $\mu_1$ and for each Gaussian covariance $\sigma_i$, but not for each Gaussian weight $\omega_i$, then the number of gradients P computed per Gaussian component is P=2D=128 gradients. In this case the Fisher vector has dimensionality E=N×P×R=256×128×4=131,072 dimensions. If four-byte floating point arithmetic is used to represent the dimensions, then the Fisher vector for the single image occupies about 0.5 megabyte.

A dimensionality reduction method such as PCA can be used to reduce dimensionality. Compressing the image vectors in this way does not always result in retention of the most useful information. A vector quantization algorithm as disclosed in Sánchez can alternatively be used to reduce the information stored. In this approach, a set of standard vectors in the vector space is defined and a given image vector is compressed by (1) identifying the closest standard vector and (2) representing the image vector by a short "codeword" representing that closest standard vector. A "codebook" provides the associations between the codes and the corresponding standard vectors. Training of the class models 84 on such compressed vectors can be performed as described in Sánchez.

2) Geographical Definition of a Place (S104)

Figure 3:
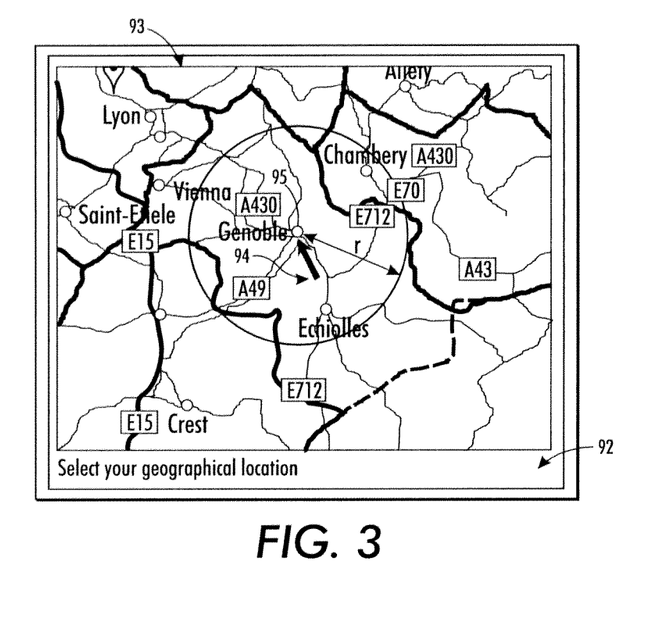
FIG. 3 illustrates an exemplary user interface which may be used with the exemplary system of FIG. 1.
Figure 4:
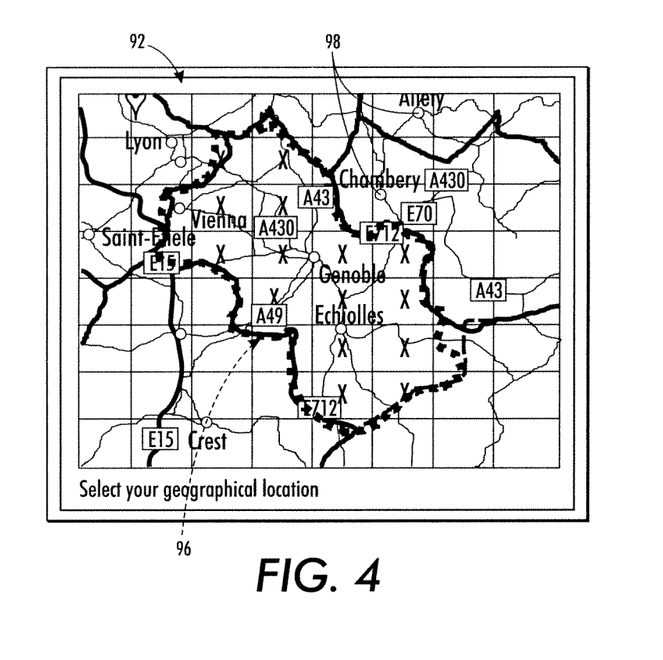
FIG. 4 illustrates the exemplary user interface of FIG. 3, illustrating an alternative method for defining a place.

In this step, a geographical region of interest (i.e., a place) is defined. In the exemplary embodiment, the user may install an application on the client device which allows the user to interact with the system 1. As illustrated in FIGS. 3 and 4, a user is provided with a user interface 92 through which a place of interest in selected. The user may be provided with a menu which displays various options for specifying a geographical region of interest. The exemplary user interface includes a visual representation 93 of a geographical region which is displayed on the display device 60 of the client device 12. The visual representation 93 may be a map, a satellite view, simplified representation of a region, e.g., pinpointing major towns and cities, or combination thereof. For example, as shown in FIG. 3, the user is presented with a map 93 via the user interface 92 and asked to click on a place of interest, e.g., by manipulation of a displayed cursor 94 with the cursor control device 62. The user may move the map 93 to display a different general location using conventional navigation tools, such as up/down/left/right arrows and/or an enlarge/reduce slider.

The user may be requested to click on a point location 95 of interest. In some embodiments (FIG. 3), the user may be asked to specify a place radius r, e.g., in miles or kilometers, or subdivisions thereof around the center 95. A circle of radius r is then displayed on the map and the user may enlarge or reduce the radius using the cursor control device or other input device, and in some cases, move its center 95. The area bounded by the boundary circle 96 of radius r is then input to the system 1 as the user's selection of the place of interest.

In another embodiment (FIG. 4), the user may be provided with the option to generate a free-form place boundary 96. The user hand-draws the boundary 96 for the region of interest on a map 92, e.g., by moving the cursor 94 or with a finger on a touch screen.

In yet another embodiment, a user may enter the name of the place of interest, such as "London," "Loire Valley," or the like, or may select from a menu which includes a list of places. In another embodiment, a user may enter the geographical coordinates of a place of interest, e.g., using decimal degrees with negative numbers for South and West, such as "42.3126, −108.4264".

The information on the user's selection is received by the place definition component 72 of the system and stored in memory 46 during processing.

Various methods for defining the place, based on the user's selection, are contemplated. In some embodiments, the place is defined directly by its geographical coordinates, e.g., center and a radius r. r may be predefined, such as 1 km, user-selected, as described above, or computed as a function of the number of images in the locality e.g., to ensure at least a threshold minimum number of retrieved images or no more than a threshold maximum number of retrieved images.

In some cases, the geographical coordinates of famous places (especially cities) may be retrieved from an information source, such as from the Internet, e.g. from websites such as www.maplandia.com. Thus, for example, if a latitude and longitude are entered, the system retrieves the maximum and minimum values of latitude and longitude stored for the recognized place which is centered approximately at or includes the selected latitude and longitude.

In the case where a user defines a free-form place boundary 96, the place definition may be computed by partitioning the map region into an array of cells 98 and for each cell which is wholly within the boundary 96, or a majority of it is within the boundary, considering the cell as part of the place (as shown by the symbol "X" in FIG. 4).

The output of S104 is a set of geographical coordinates which serve as a geographical definition of the place. These coordinates may be in the form of minimum and maximum longitude and latitude values to define a rectangle in GPS space, for one or more cells 98. The values may be defined in decimal degrees from, for example, −90.000000 to +90.000000 for latitude and −180.000000 to +180.000000 for longitude, or other number of decimal places, where, for example, the maximum and minimum values for each of longitude and latitude differ by at least 0.000001 or 0.0001 decimal degrees, e.g., up to a maximum of 1 or 5 degrees. Or the geographical place definition may be a single value for each of longitude and latitude with a radius of, for example, at least 0.01 Km, or 0.1 Km, or 1 Km and may be up to 10 Km or 100 km, i.e., defining a circle in GPS space.

3) Image Gathering (S106)

A large database 20 of geo-tagged images is available to the system 1. The database may be accessed remotely from an external server 30 and/or it may be resident on the computer 10, or even on the client device 12. A combination of databases 20 may be accessed. The methods disclosed herein are particularly suited to photographs 22 stored by a variety of people on online image sharing sites 30, such as the Flickr™ (www.flickr.com), Picasa™ (www.picasa.google.com) and Panoramio™ (www.panoramio.com) websites, or on social networking websites, such as Facebook™, LinkedIn™, or MySpace™, to the extent the photographs on such websites can be accessed. These websites contain millions of geo-tagged images. The method is not limited to such websites as there are many web 2.0 photo-sharing websites which could be used or any other collection of geo-tagged images may be used. Some of these photo sharing sites enable searching for images based on their geographic coordinates. For example, www.flickr.com provides an application programming interface (API) which enables users to download images in terms of the minimum and the maximum of the longitude and the latitude (i.e., a bounding box).

Using the geographical coordinates output from S104, a set 88 of images 22 is downloaded. The set may be quite large, e.g., at least 100 or more images are retrieved. If the geographical coordinates of S104 correspond to a complex region (as in FIG. 4), the system 1 can approximate the region as a set of non-overlapping cells 98 (where each cell corresponds to a primitive shape such as a small square) and run multiple queries on the server 30, e.g., one query for each cell.

With photographs stored in JPEG file format, the geo-tag information 26 is typically embedded in the metadata (e.g., stored in Exchangeable image file format (EXIF) or Extensible Metadata Platform (XMP) format). Latitude and longitude are stored in units of degrees with four or more decimal places.

For each retrieved image in set 88, additional meta-data can be collected, such as the user identifier, if it is available. This information can be used in S110 to smooth the results to account for a disproportionately large number of images attributed to a single user identifier.

4) Classification of Retrieved Images (S108)

The image classification step includes classifying the images 88 retrieved at S106 with respect to the taxonomy of classes defined and trained in S102. For each image 88, a signature is generated by the signature generator 70, using the same method as for the training images 82. The signature is input to each of the class models 84 which each output a score $S_C$ for the corresponding class C. The image classification component 76 may output the one (or more) most likely class C for each of the image 88 or all the classes whose score $S_C$ exceeds a given confidence threshold $\theta_C$ (along with their confidence). For example, if the class model outputs a score in the range [0,1] and the confidence threshold is 0.6, an image with a score for the class of 0.7 may be tagged with the class label and with a confidence value $V_C$ based on the score $S_C$. The confidence value $V_C$ may be the same as the score $S_C$, i.e., 0.7 in this case. It is possible for an image not to be assigned to any class if none of the class scores $S_C$ exceeds the preselected confidence threshold $\theta_C$ for the class.

As will be appreciated, the larger the number of considered classes, the higher the probability of assigning incorrect class tags to an image. This problem can be mitigated by setting the confidence threshold $\theta_C$ to achieve a target classification accuracy (e.g., by using a new set of labeled training images to test the results of each trained class model). The confidence threshold $\theta_C$ can additionally or alternatively be set as a function of the number of images downloaded at S106. Indeed, if the number of downloaded images is large, then a high confidence threshold $\theta_C$ value can be set (and therefore a large number of low-confidence tags is discarded), while still having enough tags available to compute meaningful statistics at S110. For example, only the downloaded images with the tags having the top K confidence $V_C$ may be retained from the set 88 for computing the place profile.

Another method for reducing the chance of an incorrect tag being assigned to an image is to consider whether geographically proximate retrieved images in the set 88 have the same tag and filter out tags that are determined to be outliers on this basis. This is based on the assumption that if an image corresponds to a popular (probable) class C, then other images with the same class tag should be found in its spatial neighborhood (i.e., within a small sub-region of the defined place). For example, for each class C, a tag verification process based on density estimation is performed. Assume that N images with index i=1 ... N were labeled with a given class tag C and that the 2D coordinates (in terms of longitude and latitude) of these images are denoted $z_i$. A kernel k(.,.) (such as a Gaussian kernel) is placed around each of these N images and, at a location z, the following estimate of density $D_C$ can be computed:

$$D_C = \Sigma_{i=1}^{N} k(z, z_i)$$

If the local density $D_C$ for a given image is lower than a threshold $\theta_D$, then the tag C for this image is removed. The bandwidth of the kernel and the threshold $\theta_D$ reflect the level of confidence in the number of images of a given activity which should have been taken within a given radius. These parameters can be learned automatically on a per-class basis (e.g., through grid search since there are only two parameters (the kernel bandwidth and threshold $\theta_D$, mentioned above) to achieve a target classification accuracy or coverage.

The remaining tags/class scores/confidence values, after any filtering, constitute the image-level statistics to be input to the profile component 78, which aggregates the scores according to a predetermined aggregating function.

5) Score Aggregation (S110)

Figure 5:
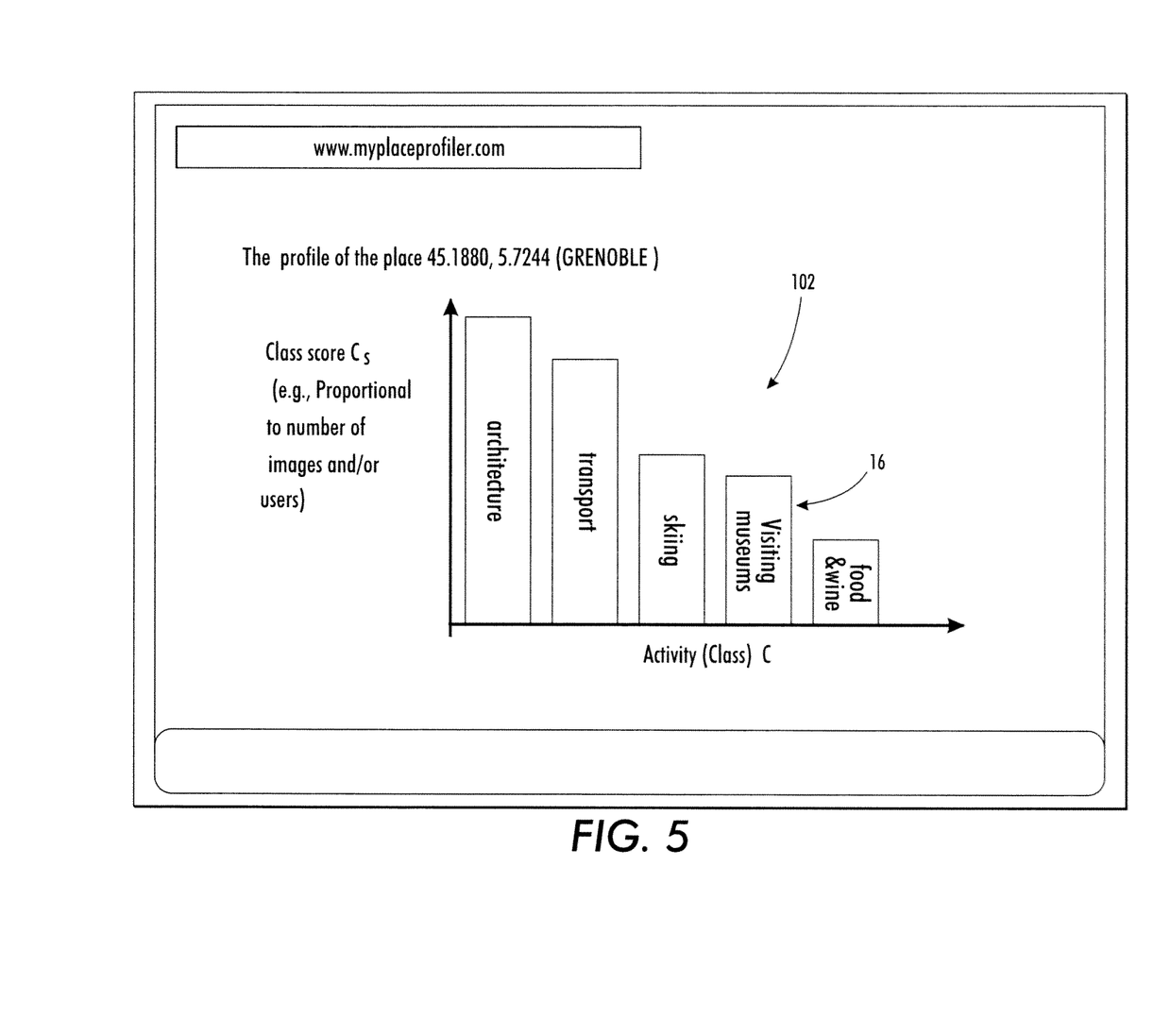
FIG. 5 illustrates a representation of a place profile in accordance with one exemplary embodiment.

A profile 16 of the determined place is computed at S110. This may include aggregating the image-level statistics computed at S108 into a place-level representation 16. In one embodiment, the profile may be generated by counting, for each class C, the number of images $N_C$ with the associated tag. The counts can be weighted by the associated confidence values $V_C$. A histogram can then be generated which represents the optionally weighted counts for all the classes. This histogram representation can be L1 normalized to account for the number of retrieved (or labeled) images: each histogram bin thus represents the proportion of images ($C_s$) assigned to each activity. $C_s$ is referred to herein as the class or activity score (FIG. 5).

It is to be appreciated that a class may have a very high score $C_s$ because a single (or few) enthusiastic tourist(s) took a large number of pictures pertaining to that class (i.e., are disproportionately represented in the retrieved images). However, in general, a user will be interested in activities which were of interest to many other users. Therefore, rather than counting the number of images, the number of users who took pictures pertaining to a given activity (as represented by the user ID in the image metadata) can be counted and used as the class score $C_s$. In this case, $C_s$. does not take into account the number of individual images of a given class taken by the same user and therefore better reflects the class/activity popularity. In other embodiments, the class score may be a function of both the number of images and number of user IDs.

For some applications, users may not be interested in the proportion of images (and/or users) related to a given class/activity in the absolute but rather, relative to other places. Therefore, the class score $C_s$ of a given activity for a given place can be turned into a relative value, e.g., between 0 and 100, which reflects the rank of this place with respect to other comparable places for the considered class. As "comparable" places, the system may only compare, for example, cities of a given size/population with other cities of the same approximate size/population. For example the class score computed as above could be expressed as a ratio, e.g., a percentage, of the average (e.g., median or mean) score for that class from a set of place profiles. Similarly, each class score can be turned into a binary value: 0 if the score of a class for a place is lower than the average (e.g., median or mean) score for this class as estimated on a set of places and 1 if the score is higher than the average.

In some embodiments, the system 1 may consider only the top ranked or a few of the top ranked classes as representative of the place profile.

The place profile 16 may be output in numerical form, e.g., as a vector in which each element of the vector corresponds to a class and in general at least two of the elements are non-zero.

In some embodiments, a visual representation 102 of the place profile 16 can be generated for display to a user via the GUI. The profile 16 of a geographical place may thus be displayed or otherwise output as any one or more of:

a) a histogram of activity scores, as illustrated, for example, in FIG. 5 (e.g., showing only the most popular classes), b) a ranked list of classes, e.g., including only the most popular classes in order of popularity with the highest score being assigned a rank of 1, and the other scores numbered sequentially in order of decreasing score from 2 to n, or as an unordered list, c) a list of those classes which exceed the median score for the class as determined for a set of places, optionally ranked based on the class scores, or in any other suitable manner which is representative of the class-based statistics for multiple retrieved images.

In some embodiments, the representation may be interactive. For example, if the user clicks on the area of the display screen 60 showing, for example, the "transport" score, images in the set of images 88 which have been tagged with the transport class by the classifier 84 may be retrieved from memory 46 and displayed to the user via the GUI.

6) Applications

Various applications are contemplated for the exemplary place profile (S114). The following are intended as exemplary only.

A. Recommender Systems

In one embodiment, the place profile 16 is used in recommendation systems. For example, if a person has a profile which describes his or her interests (with respect to the classes/activities defined at S102), then the system can compute a match between the personal profile and a set of place profiles and subsequently return the places with the highest match. To build a personal profile, a user may be asked to enter explicitly his/her interests through an interface. Alternatively, the personal profile may be computed automatically from the person's own images, as disclosed for example, in U.S. patent application Ser. No. 13/050,587, incorporated herein by reference. As disclosed therein, the generating of a personal profile includes categorizing the set of the user's images into a finite set of image categories (here, activity classes), based on image content of the images in the set (e.g., using an image signature, computed as described above), using a classifier/class models, which as/have been trained on the finite set of image categories, such as models 84. The user's images may be retrieved, for example, from the client computing device 12, from a user's page of a social networking site, and/or by querying database 20 by user ID. The match between the user profile and each of a set of place profiles can be computed based on a subset of classes, e.g., the top class(es) in the user profile and the top class(es) in the place profiles, or by computation of a suitable distance metric, such as the Earth Mover's distance, Euclidean distance, $chi^2$ distance, Manhattan distance, or other suitable distance metric. The system may output the place profile having the highest computed similarity/least distance to the user's profile or a small subset of the set of place profiles based on the computed matches.

The recommendation of a place could additionally or alternatively be based on past experiences. For example, a user may enter in the system a place or places that the user enjoyed and may query the system for similar places. In this embodiment, the system compares the place profile of the place with precomputed profiles of a set of other places to find similar places, based on their profiles.

B. Advertising

The place profile may be used in generation of targeted advertisements. For example, a set of different advertisements are associated with each of the classes/activities defined at S102. Then, if a person queries for a place (for instance, in a web search engine), an advertisement could be triggered if the corresponding class score for that place exceeds a given threshold. For example, a sporting goods seller may have advertisements for skis and bicycles. If the queried place has a higher score for skiing than cycling in its place profile and/or the skiing score exceeds a given threshold, the advertisement related to skis is automatically output. The advertisement may be displayed to the user automatically, e.g., as a banner, pop-up, sidebar, or the like. Also, an advertisement could be placed automatically next to the text in a web-page if it refers to a given place.

C. Personal Profile

Place profiles 16 may be used to compute a personal profile. For example, the person submits a list of places that he likes and the system generates a place profile 16 for each place. The place profiles can then be aggregated (e.g., simply averaged, for each class) to form a personal profile. If the user has ranked or provided rating scores for the places, the person profile may be computed by performing a regression from the place profiles to the rating scores.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for generating a place profile.

The exemplary system and method have several advantages over existing methods and systems for recommending places and activities. Existing systems tend to be manually intensive and do not make use of the content of images and/or image classification technologies.

Several references have proposed to mine automatically popular landmarks from collections of geo-tagged images. See, e.g., Y.-T. Zheng, et al., "Tour the world: building a web-scale landmark recognition engine," CVPR 2009, and S. Gammeter, et al., "I know what you did last summer: object-level auto-annotation of holiday snaps," ICCV 2009. The exemplary system, rather than automatically discovering popular landmarks (unsupervised learning), is able to profile places according to a set of learned classifiers (a supervised learning approach), which can provide complementary information to such systems.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for computing a place profile, comprising:
providing a geographical definition of a place;
retrieving a set of images based on the geographical place definition;
for each of the images in the set of images, generating an image-level representation comprising extracting a set of patch statistics for each of a set of patches of the image and aggregating the patch statistics into an image-level representation, the patch statistics being based on features of pixels of the respective patch;
with a classifier, generating image-level statistics for the retrieved images based on the image-level representations including labeling images with class labels, the classifier having been trained to generate image-level statistics for a finite set of classes, and filtering a class label of a retrieved image based on a computed geographical density of other retrieved images with a same class label; and
aggregating the image-level statistics to generate a place profile for the geographically-defined place,
wherein at least the generating and aggregating are performed with a computer processor.

2. The method of claim 1, further comprising training the classifier on a training set of images labeled according to class.

3. The method of claim 1, wherein the providing of the geographical definition of the place comprises receiving geographical coordinates for a place and defining a region based on the received coordinates.

4. The method of claim 1, wherein the providing of the geographical definition of the place comprises providing for a map to be presented to a user and receiving a user's selection of a place on the map.

5. The method of claim 1, wherein the retrieving of the set of images based on the geographical definition of the place comprises retrieving images based on geoposition information associated with the retrieved images.

6. The method of claim 1, wherein the generating image-level statistics further comprises labeling images with class label where the classifier score for the class exceeds a threshold value.

7. The method of claim 1, wherein the aggregating of the image-level statistics to generate a place profile comprises computing, for each class in the set, at least one of:
an optionally weighted sum of images in the set of images that are labeled by the classifier with the class; and
a sum of the different users whose retrieved images in the set of images are labeled with the class.

8. The method of claim 1 wherein the classes comprise tourist activities.

9. The method of claim 1, further comprising outputting the place profile.

10. The method of claim 9, wherein the outputting comprises generating a representation of the place profile for display to a user on a graphical user interface.

11. The method of claim 1, further comprising generating a recommendation of a place for display to a user based on a user's profile and place profiles for a set of places, each of the place profiles being computed according to the method of claim 1.

12. The method of claim 1, further comprising comparing a first place profile with at least one second place profile, the first and second place profiles being generated according to the method of claim 1.

13. The method of claim 1, further comprising generating a user profile based on a plurality of place profiles generated according to the method of claim 1.

14. A system for generating a place profile comprising memory which stores instructions for performing the method of claim 1 and a processor, in communication with the memory, for executing the instructions.

15. A computer program product comprising a non-transitory recording medium which stores instructions which, when executed by a computer, perform the method of claim 1.

16. A graphical user interface comprising a display which receives a selection of a place from a user and displays a place profile which has been generated by the method of claim 1.

17. The method of claim 1, further comprising:
for a predefined set of activity classes, training the classifier on training images labeled according to the activity classes in the set of activity classes; and
with the trained classifier, generating the image-level statistics for the retrieved images in the set of retrieved images.

18. The method of claim 1, wherein the aggregating the image-level statistics to generate a place profile comprises generating a histogram of class scores generated through aggregation of the image-level statistics.

19. A system for computing a place profile, comprising:
a place definition component for generating a geographical definition of a place, based on information received from a user;
an image selection component for retrieving a set of images corresponding to the geographical definition of the place from an associated database of images tagged with geoposition information;
a signature generator which generates, for each of the retrieved images, an image signature based on statistics computed on image data of the image, the image data being based on features of pixels of the image;
an image classification component which has been trained on a finite set of classes for classifying the retrieved images to generate image-level statistics, the classifier classifying the retrieved images with class labels based on their image signatures and filtering a class label of a retrieved image based on a computed geographical density of other retrieved images with a same class label;
a profile component for aggregating the image-level statistics to generate a place profile for the geographically-defined place; and
a processor which implements the place definition component, image selection component, signature generator, image classification component, and profile component.

20. The system of claim 19, further comprising a graphical user interface for a user to query the system about a particular place and to visualize the place profile.

* * * * *